United States Patent [19]

Jones

[11] 3,968,582
[45] July 13, 1976

[54] GAMING TOKEN AND PROCESS FOR FABRICATING SAME

[76] Inventor: Bernard B. Jones, 3672 S. Highland, Las Vegas, Nev. 89103

[22] Filed: Feb. 6, 1975

[21] Appl. No.: 547,560

[52] U.S. Cl.............................. 40/27.5; 273/148 R; 264/246; 29/160.6; 29/453
[51] Int. Cl.².......................................... G09F 3/02
[58] Field of Search............ 40/27.5, 10 R; 273/148; 264/246, 247; 29/160.6, 453, 450

[56] References Cited
UNITED STATES PATENTS
1,475,652  11/1923  Polizzi.................................. 40/27.5
3,766,452  10/1973  Burpee et al. ................... 40/27.5 X

*Primary Examiner*—John H. Wolff
*Attorney, Agent, or Firm*—William J. Bethurum

[57] ABSTRACT

An improved gaming token and fabrication process therefor wherein an injection molding compound is applied at selected preconfigured locations within and between a pair of aligned, substantially flat annular non-metallic rings. The common interface between the injected molding compound and the annular rings receiving the molding compound is seen as continuous sharply defined lines between the different colors of the molding compound and of the rings, respectively. These lines define preconfigured surface designs which are contiguous with the outer surfaces of the two annular rings.

One or more coins may be mounted in a central opening defined by certain portions of the annular rings, and these coins impart an added measure of control over the distribution of these tokens in instances where the annular rings are made by authorized outside vendors.

15 Claims, 14 Drawing Figures

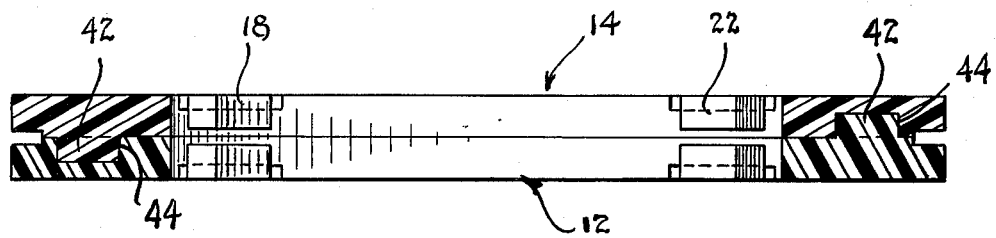
Fig. 6
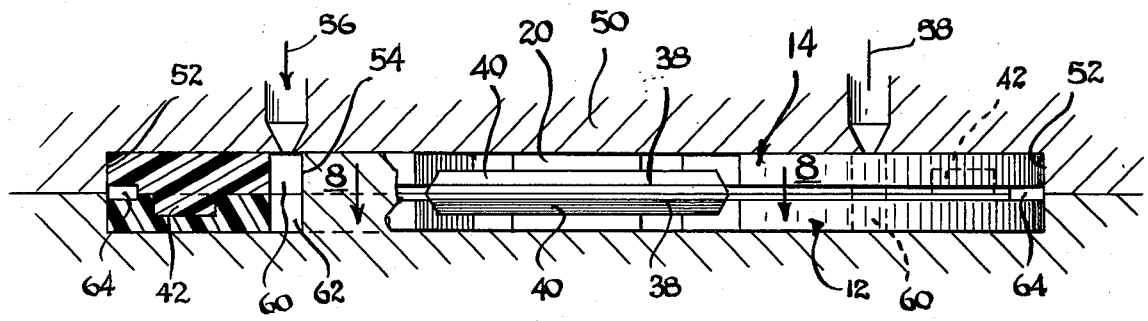
Fig. 7
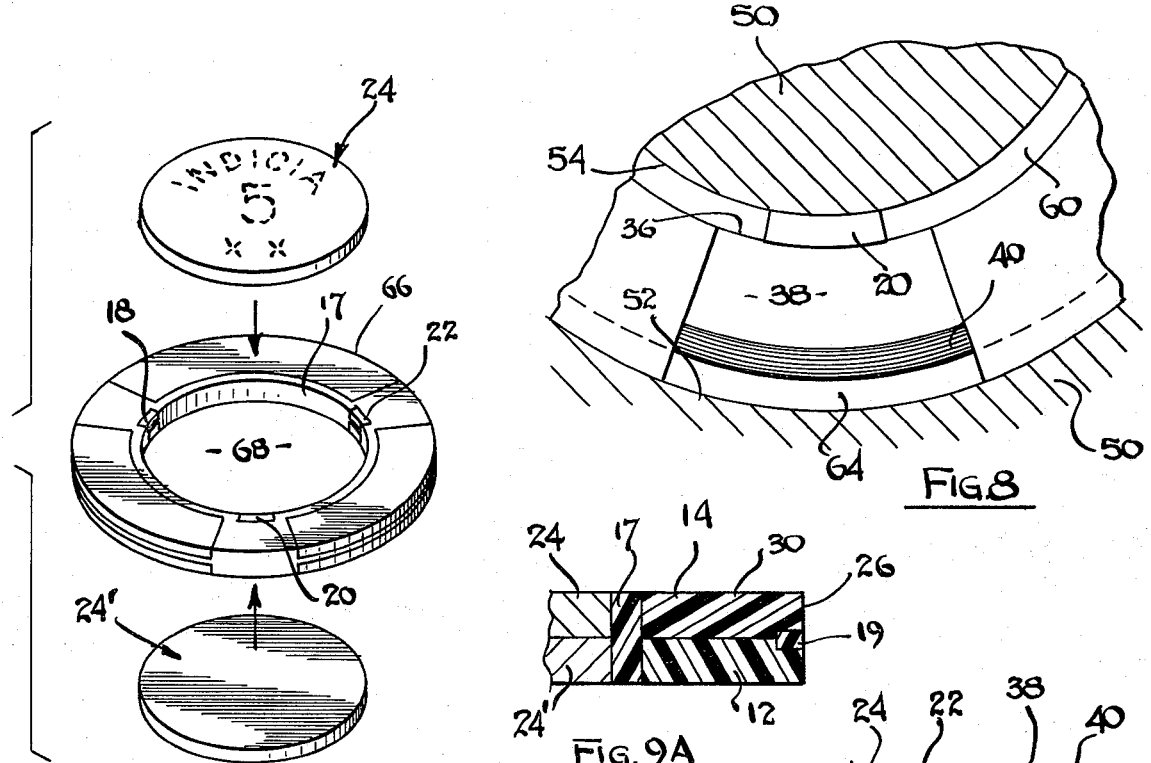
Fig. 8
Fig. 9A
Fig. 9B
Fig. 10

GAMING TOKEN AND PROCESS FOR FABRICATING SAME

FIELD OF THE INVENTION

This invention relates generally to denominational gaming tokens and a process for fabricating same. More particularly, the invention is directed to a novel combination plastic and metal casino chip characterized by sharply improved design and color line definition on the surface thereof. Additionally, the chip features improved resistance to normal casino use and thereby maintains its original thickness during the life of the chip. This is a very important feature from the standpoint of counting stacked chips. As will be seen herein, the manufacturing process for fabricating these casino chips is highly flexible insofar as variation in color design and chip configuration are concerned.

BACKGROUND

As is generally well known, many legal games of chance are played with denominational tokens ranging from one dollar up to as high as five thousand dollars, and these tokens may typically include denominations of $1.00, $2.50, $5.00, $10.00, $20.00, $25.00, $50.00, $100.00, $500.00, $1,000.00 and $5,000.00. Thus, it becomes necessary to specify different color designs or color combinations or both for the surfaces of these gaming tokens in order to render the particular monetary denomination of the token readily and visually apparent to both the players of a game and casino personnel handling these tokens.

In addition to desiring sharp and durable color and pattern definition for these tokens for easy recognition purposes, there is yet another equally important reason for preferring these sharp visual characteristics in a casino chip. This reason is to make it extremely difficult for counterfeiters to readily duplicate these designs and patterns with conventional "paint-on" processes. Thus, not only is it desirable for a particular casino token design or pattern to have a sharp and durable definition so that its monetary denomination is readily discernible, but it is also preferred that such definition will, during the life of the token, render a side-by-side counterfeit coin immediately apparent. As will be described further herein, the present invention is embodied in a hard-to-counterfeit casino token with all of the above characteristics of sharp and durable line definition for the particular colors and surface designs for the token.

PRIOR ART

There are at least two prior approaches known to me for fabricating casino tokens so they will exhibit different color patterns corresponding to a particular monetary denomination. The first of these approaches utilizes a compression molded clay-like compound which is molded in a round disc configuration in various colors. The central portion of the disc, or chip, is subsequently hot-stamped with the casino name or logo and a denomination. A variation of the above chip involves the addition of one or more "inserts" in one or more colors at equal spacings around the outer periphery of the chip and extending inwardly of the periphery a distance of approximately ¼ inch. This is accomplished by first removing sections from the periphery of a premolded pliable slug and replacing the sections with pieces (inserts) of another color prior to being compressed into a chip of a definite size and configuration. While this first approach has proven satisfactory in certain limited respects, the absence of sharp definition between the chip proper and the colored edge inserts renders the chip vulnerable to counterfeiting by the hand painting of the colored edge inserts.

A second prior art approach known to me for fabricating denominational casino chips consists of providing a starting cast metal disc which is configured with certain cavities or passages defining the casino logo and denomination, and injecting a plastic compound of various colors into these cavities. Using this second approach, the completed casino token thus formed is a unitary metal and plastic disc member in which some portions of the cast metal extend to the outer edges of the completed disc.

While this second approach provides a token with durable metal-to-plastic surface pattern definition, there are, nevertheless, at least two distinct disadvantages with this approach to token fabrication. The first of these is that the cast metal member extends to the edge of the completed token, and this produces unwanted metal-to-cloth token edge wear on the gambling tables on which these tokens are used. Secondly, coins made by the latter approach normally require only a single injection molding operation. Thus, in instances where such injection molding operation is carried out by outside vendors, the ultimate distributor loses his complete control over the completed fabrication and distribution of these tokens. That is, the ultimate distributor of the tokens can never be totally sure that the operators of the injection molding equipment are not making more tokens than they are specifically authorized to make.

THE INVENTION

The general purpose of the present invention is to provide a new and improved casino token and related process for fabricating same wherein the token has all of the advantageous features of sharp and durable color and pattern definition, while simultaneously enabling the ultimate distributor of the token to maintain complete control over the token fabrication and distribution.

To attain this purpose, I have developed a novel injection molding fabrication process for the construction of a novel gaming token, and this token includes a pair of symmetrical, relatively flat annular rings of plastic molding material. These rings have substantially parallel major surfaces and substantially concentric minor surfaces extending between the major surfaces. Each of the pair of rings includes a preconfigured offset or indented surface region therein which is aligned with the corresponding offset region the other ring, so that these offset regions then define the predetermined cutaway indentations beneath the major surfaces of these rings.

An injection molding compound is applied to these indentations and is thus formed contiguous and coplanar with the major surfaces of these annular rings. By changing mold colors and by altering the shapes of the molds used to form the annular rings, the color and pattern configuration of the molding compound may be easily varied in accordance with a particular coin denomination. Finally, one or more metal coins are disposed within a central opening defined by the two abutting annular rings. Advantageously, the molding compound is applied between the inner edges of the annular rings and the outer edges of the coins, so that the surface designs formed by the molding compound are sharp and continuous over the entire surface of the completed token. Thus, it is virtually impossible to counterfeit this token using a silk screen painting or other conventional coin fabrication process.

Accordingly, it is an object of the present invention to provide both a novel gaming token and a novel fabrication process for constructing same.

Another object is to provide a gaming token of the type described wherein sharply defined and durable color lines define surface patterns on the token indicative of a particular monetary denomination.

Another object is to provide a gaming token of the type described which is difficult to duplicate by counterfeiters.

Another object is to provide a gaming token of the type described which, upon visual comparison with a counterfeit token, renders the presence of the counterfeit token readily apparent.

A feature of the invention is the provision of a process for token fabrication wherein annular rings for the token may be made by outside vendors and returned to the ultimate distributor for the final fabrication (coin insertion) step of the token. At the same time, however, the process is highly flexible in the variability of surface colors and color patterns.

Another feature is the provision of an injection molding process of the type described which is especially well suited for the distribution control of gaming tokens, while simultaneously enabling selected piece parts of the completed token to be manufactured by one or more outside vendors.

Another feature is the provision of a new and improved process of the type described which lends itself to substantial flexibility in weight control as a result of the utilization of both plastic and metal piece parts whose dimensions can be tailored to a particular weight specification or to a particular metal and plastic pattern specification.

Another feature is the provision of a new and improved process of the type described wherein certain piece parts of the completed token may be readily coated by the distributor with fluorescent films or the like, thereby making possible the ready inspection of these tokens under a fluorescent lamp or the like.

Another feature is the provision of a new and improved process of the type described which is readily adaptable to the use of a suitable, detectable metallic paint which may be concealed between certain piece parts of the token so as to render the token useable in alarm systems which are capable of detecting the unauthorized movement of these tokens from certain monitored areas.

These and other objects and features of the invention will become more readily apparent in the following detailed description of the accompanying drawings.

DRAWINGS

FIG. 1 is a perspective view of a gaming token embodying the invention.

FIGS. 2 and 3 are plan views of the two opposite sides of the two non-metallic annular rings used in fabricating the token in FIG. 1.

FIGS. 4a through 4d are four cross section views taken along lines A, B, C and D, respectively, in FIG. 3.

FIG. 5 is an exploded view of the two annular nonmetallic rings of the token as they are aligned in the injection molding press to be described.

FIG. 6 is an elevation view, partly in section, of the two annular rings as they are mated together just prior to an injection molding operation.

FIG. 7 is an elevation view, partly in section, of the two annular rings inserted into an injection molding apparatus.

FIG. 8 is a fragmentary plan view of a portion of the mated annular rings being held in the injection molding apparatus.

FIGS. 9a and 9b are cross section views taken along lines A and B of FIG. 8.

FIG. 10 is an exploded view of the completed molded composite annular ring member and the two metal coin members which serve to complete the gaming token according to the invention.

Figure 1:
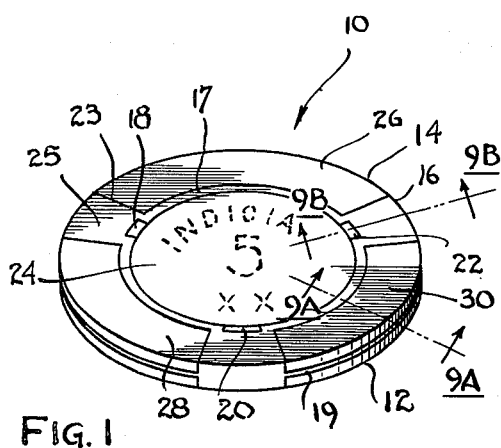
Referring now to FIG. 1, there is shown in perspective view a combination metal and plastic injection molded denominational token, designated generally 10 and embodying my invention. The token 10 includes a pair of generally flat annular rings 12 and 14 which are in perfect alignment and to which an injection molding compound 16 has been applied. The injection molding compound 16 is contiguous and co-planar with both of the opposite major surfaces of the annular rings 12 and 14, and it is also contiguous and coextensive with the minor annular surfaces of these annular rings 12 and 14. The latter portion of the continuous molding compound 16 takes the form of an inner annular ring 17 which is interrupted by the three radially extending tabs 18, 20 and 22 which are spaced at 120° intervals within the inner annular opening of the rings 12 and 14. The tabs, e.g. 18, 20 and 22 are integral respectively with each of the two annular rings 12 and 14 and are perfectly aligned with like tabs on an abutting ring, so as to form three distinct arcuate mounting surfaces which are contiguous with the inner ring 17 of molding compound previously described.
Figure 4A:
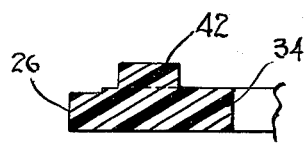
Figure 4B:
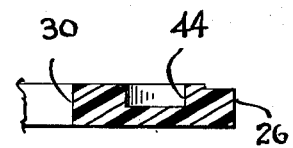

The molding compound 16 is also formed in the spaced indentations or offset regions 23 (to be further described) of the two rings 12 and 14, and additionally this compound forms the sharp lines or stripes 19 seen on the outer periphery of the token. These lines are also symmetrically spaced around the outer periphery of the token. Thus, the molding compound 16 forms symmetrically spaced flat surface areas 25, the interrupted inner annular ring 17 and the sharp outside color stripes 19 which are all part of one continuous mass of molding compound 16 which has been injected into all of the indentations and cavities formed by the two rings 12 and 14 when they were perfectly aligned in an injection molding press.

A denominational coin 24 is positioned as shown in the inner annular opening formed by the rings 12 and 14, and particularly the opening formed by the molding compound 17 and arcuate tabs 18 previously described. The coin 24 is preferably stamped from a metal sheet as a thin metal disc which is mounted back to back with a second like metal disc in the central portion of the token 10. These two discs are each stamped on one side thereof with appropriate denominational indicia and, if desired, the stamped denominational indicia may be painted in a conventional manner before the two metal coins are mounted back to back in the central opening of the token 10.

If desired, a suitable, electronically detectable paint or thin film material can be applied to the abutting faces of one or both of the centrally disposed metal coins 14. In this manner, the token 10 may be utilized in an electronic alarm token monitoring system which responds only to the particular detectable paint or film material used, thereby providing an indication to casino personnel of the passage of a particular token past a token monitoring station. This feature is of particular interest to casinos where very high denominational tokens have, upon occasion, been swallowed or otherwise concealed in body cavities by would-be-thiefs.

Figure 2:
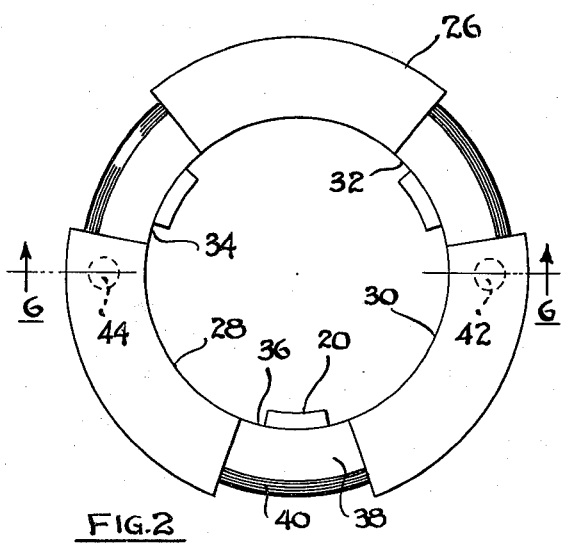
Figure 3:
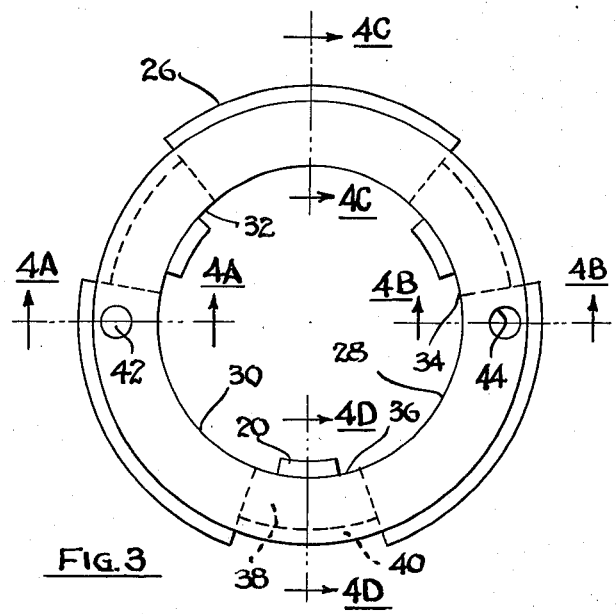

In order to develop a better understanding of the exact process by which the novel gaming token 10 in FIG. 1 is fabricated, reference should now be made to the remaining figures of the drawing and initially to FIGS. 2 and 3 which show, in plan view, two generally flat annular rings 12 and 14. Each ring includes three major surface portions 26, 28 and 30 between which I have provided three equally spaced offset regions or indentations which are identified by numerals 32, 34 and 36 respectively. These indentations are slightly offset beneath the major surface portions 26, 28 and 30 of the two rings 12 and 14, and each offset portion, e.g. 36 includes a tapered outer lip 40. This lip is contoured to meet at a common vertex with an identical lip on the abutting ring when these two rings are aligned in face-to-face relationship immediately prior to an injection molding operation. During this alignment, an index marker pin 42 and index opening 44 are aligned with a corresponding index opening and pin, respectively, on an abutting ring. Thus, when the two rings 12 and 14 are aligned for an injection molding operation, both the major surface portions 26, 28 and 30 and the offset portions 32, 35 and 36 of the two rings are also aligned to thereby define the cavities into which the injection molding compound flows.

Figure 5:
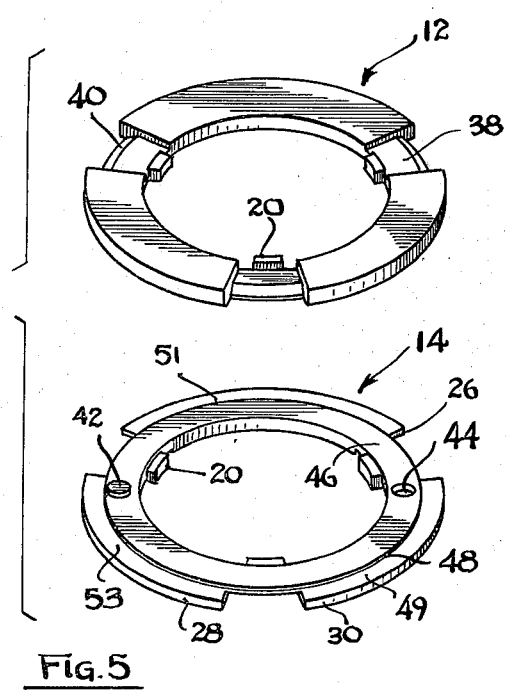
Figure 4C:
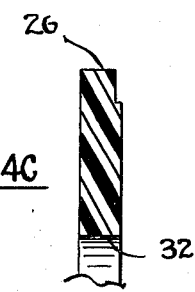
Figure 4D:
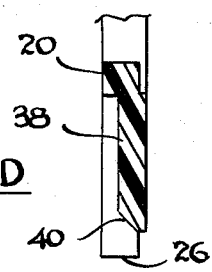

Referring now to FIG. 5, each of the annular rings 12 and 14 also includes, on its other side, a continuous flat narrow ring portion 46 which is slightly offset from the above major surface portions 26, 28 and 30 by a vertical collar 48. The thickness of this collar or edge 48 together with the thickness of an abutting collar insures that the undersides 49 of the major surfaces 26, 28 and 30 of the aligned rings are separated by a predetermined amount. Therefore, when the two rings 12 and 14 are brought into perfect alignment as described in preparation for an injection molding step, the underside surfaces 49, 51, and 53 of the abutting rings, together with their adjoining collar portions 48 define narrow spaced cavities into which injection molding material will flow to form the sharply defined outer lines 19 as seen in FIG. 1 above. These sharp lines, together with the general overall sharpness of the lines defining the boundaries of the rest of the molding compound 16, renders the present gaming token readily distinguishable visually from any prior art gaming tokens known to me.

Referring now to FIG. 6, there are shown the two rings 12 and 14 as they are aligned for molding, and these rings appear in partial cross section just prior to being inserted into the injection molding press 50 of FIG. 7. This injection molding press 50 has an opening therein into which the outer periphery of the token 10 is received, and the inner annulus 54 of the press 50 is dimensionally equal to the diameter of the two abutting coins 24, previously described. Thus, an injection molding compound is applied under pressure through the passages 56 and 58 on each side of the molding press 50 and flows into the openings 60 and 62 defined by both the annular rings 12 and 14 and also the inner surfaces of the molding press 50. This hot molding compound flows both perpendicular and parallel to the major surfaces of the annular rings 12 and 14 and thus fills the previously described cavities within these rings to thereby form the regions 16, 17 and 19 in FIG. 1.

After the injection molding operation illustrated in FIG. 7 is completed, the injection molding press 50 is disassembled to enable the completed ring 66 in FIG. 10 to be removed therefrom. The injection molding operation is now complete and the composite flat annular ring structure 66 as shown in FIG. 10 exhibits the colored and symmetrically spaced alternate ring and molding compound portions over 360° of the surface area thereof. And, FIG. 10 clearly shows the radially extending tabs 18, 20 and 22 which are aligned with similar tabs on the adjacent ring. These tabs are also continuous with the inner molding compound 17 which is now ready for receiving the coins 24 and 24' as shown in FIG. 10. These coins 24 and 24' may be hand pressed into the central opening 68 of the composite ring 66, and then an ultrasonic vibrator (not shown) may be applied at the edges of the inserted coins and the corresponding edges of the composite ring 66 to cause either the molding compound 17 or the tabs 22 or both to press fit securely against the two back to back metallic coins 24 and 24'.

While I have disclosed a preferred embodiment of the novel casino token and process for fabricating same according to my invention, many modifications may be made in the exact token construction shown and in the particular injection molding process described without departing from the true spirit and the scope of my invention. For example, obviously the exact design of the major surfaces 26, 28 and 30 and adjacent offset regions 32, 34 and 36 of the token may be geometrically changed to any desired surface stamp and color pattern without departing from the scope of my invention. Furthermore, my novel token is not limited to the use of three equally spaced surface regions 26, or three equally offset portions 32 or three equally spaced radially extending tabs 20. If desired, only two such spaced ring portions may be used, or alternatively, more than three of these ring portions may be used for a particular token configuration.

It is also to be understood that the novel casino token according to the invention is not specifically limited to the use of two centrally disposed metal coins 24 and 24'. If desired, a single metal coin may be mounted in the central opening 68 of the composite annular ring structure 66 as shown in FIG. 10. Furthermore, a single detectable metal disc or other detectable material could be sandwiched between two plastic discs, and said plastic discs could be then used for denominational stamping purposes.

If required, another chip variation could involve the elimination of the three tabs which hold the metal coins, and these coins could be held by a continuous and closed inner periphery of the two annular rings.

What is claimed is:
1. A gaming token comprising:
 a. first and second relatively flat annular rings, each having substantially parallel major surfaces and substantially concentric minor surfaces extending between said major surfaces;

b. each of said rings having spaced apart offset surface regions facing like regions of an aligned ring to thereby define preconfigured volumeric indentations beneath the major surfaces of said rings;

c. a molding compound formed within the confines of said indentations and contiguous with the major surfaces of said rings to thereby define a predetermined color pattern corresponding to a particular monetary denomination of the token; and d. metal coin means removably disposed within a central opening defined by said rings, whereby a common interface between the molding compound and the annular rings provides a highly sharp and durable surface pattern definition for said token.

2. The token defined in claim 1 wherein the abutting surfaces of said aligned rings have mutually engaging index marks and openings therein to insure a perfect alignment of said rings.

3. The token defined in claim 2 wherein:

a. corresponding portions of abutting surfaces of said rings are dimensionally spaced apart at the periphery thereof so as to form a plurality of spaced apart cavities around the periphery of said rings, and b. a molding compound formed in each of said spaced apart cavities to there define sharp color lines concentric with the minor surfaces of said rings and integrally formed with the molding compound in said indentations.

4. The token defined in claim 3 wherein:

a. each of said rings includes a plurality of spaced apart radially extending tabs in substantial alignment with corresponding tabs on an abutting ring to thereby form a plurality of arcuate mounting surfaces, whereby coins may be mounted on said arcuate surfaces, said coins and said surfaces of said rings defining a plurality of arcuate openings between said coin means and said rings; and b. a molding compound disposed in said plurality of arcuate openings, contiguous with the major surfaces of said rings and integral with the previously defined molding compound to thereby define sharp continuous color lines on the surfaces of said token.

5. The token defined in claim 4 wherein said coin means includes first and second metal coins of predetermined denomination mounted back-to-back on said plurality of arcuate mounting surfaces extending from each of said rings.

6. The token defined in claim 5 which further includes:

a. a plurality of design indentations formed on the major surfaces of said rings, and b. a fluorescent coating evaporated on the surfaces of said rings to thereby render said token readily detectable under a fluorescent lamp or the like.

7. The token defined in claim 5 which further includes an electronically detectable film or paint concealed on the abutting surfaces of said first and second coins, whereby the removal of said coins from a predetermined location may be monitored.

8. The token defined in claim 1 wherein:

a. corresponding portions of aligned surfaces of said rings are spaced apart adjacent the outer peripheral portions of the ring and there define one or more cavities between adjacent rings and spaced around the periphery thereof, and b. an injection molding compound formed in each of said cavities to there define sharp line-like color patterns of high definition concentric with the minor surfaces of the rings and integrally formed with the molding compound in said indentations.

9. The token defined in claim 1 wherein:

a. each of said rings includes a plurality of spaced apart and radially extending tabs in substantial alignment with corresponding radially extending tabs on an aligned ring to thereby form a plurality of arcuate mounting surfaces, whereby metal coin means may be mounted on said arcuate mounting surfaces, said coin means and the inner minor surfaces of said rings further define a plurality of arcuate openings extending between said coin means and said rings; and b. a molding compound disposed in said plurality of arcuate openings, contiguous with the major surfaces of said rings and further integral with the molding compound in said plurality of indentations, whereby said molding compound is continuous within said token and defines a continuous surface pattern on the surface thereof.

10. The token defined in claim 1 wherein said coin means includes first and second metal coins of a selected denomination mounted back-to-back within an opening defined by said annular rings.

11. A process for fabricating gaming tokens which includes the steps of:

a. providing a pair of generally flat annular rings, each having a preconfigured offset design therein, b. concentrically aligning said rings so that the respective offset designs therein become aligned and define predetermined geometric indentations beneath the major surfaces of said rings, c. injecting a molding compound into said indentations and of a color different from that of said rings, so that color patterns with sharp and durable lines are formed contiguous with the surfaces of said rings, and d. mounting one or more denominational coins in a central opening of said rings to form a completed token, whereby said rings may be manufactured and injection molded by one or more vendors without losing distribution control over said completed token.

12. The process defined in claim 11 wherein the injection molding step includes:

a. inserting the aligned rings in a molding cavity of a predetermined annular volume and configuration, and b. forming an inner annular ring of molding compound at the inner periphery of said rings and integral with molding compound formed in said indentations.

13. The process defined in claim 12 which further includes:

a. forming a plurality of cavities between spaced apart abutting regions of said rings, and b. injecting a molding compound into said cavities to thereby form a sharp outer line on the outer periphery of said token whereby the injected molding compound is seen as a continuous surface pattern on said token different in color from that of said annular rings.

14. The process defined in claim 13 which includes mounting a pair of coins of predetermined denomination back-to-back in a central opening of said annular rings, whereby an electronically detectable film or the like may be applied between said coins and detected by an electrical alarm system or the like.

15. The process defined in claim 13 which further includes applying a fluorescent coating to one or more of said rings to thereby render the completed token detectable under a fluorescent lamp or the like.

* * * * *